Figure 1:
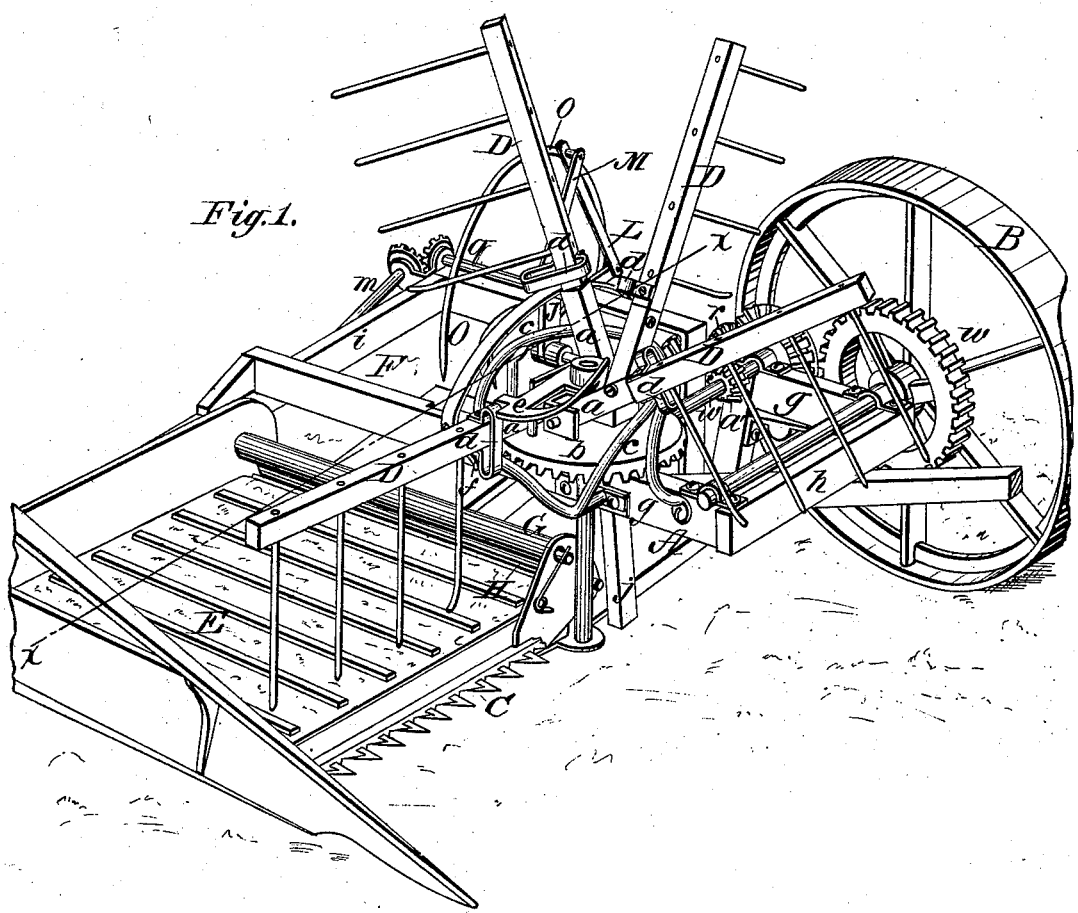

2 Sheets—Sheet 1.

W. A. KIRBY.
Grain-Binder.

No. 217,541. Patented July 15, 1879.

Witnesses:
Donn J. Twitchell
W. W. Dodge

Inventor:
W. A. Kirby
By his Attys.
Dodge & Son

2 Sheets—Sheet 2.

W. A. KIRBY.
Grain-Binder.

No. 217,541.  Patented July 15, 1879.

Witnesses:
Donn J. Twitchell.
W. W. Dodge.

Inventor:
W. A. Kirby.
By his Attys.
Dodge & Son.

UNITED STATES PATENT OFFICE.

WILLIAM A. KIRBY, OF AUBURN, NEW YORK.

IMPROVEMENT IN GRAIN-BINDERS.

Specification forming part of Letters Patent No. 217,541, dated July 15, 1879; application filed February 20, 1879.

*To all whom it may concern:*

Be it known that I, WILLIAM A. KIRBY, of Auburn, in the county of Cayuga and State of New York, have invented certain Improvements in Automatic Grain-Binding Machines, of which the following is a specification.

The object of this invention is to produce an automatic harvesting and binding apparatus which will be cheaper, lighter, and more simple than those now in use; which will avoid the use of the usual grain-elevating mechanism; which will permit the use of an ordinary sweep-rake rear-cut harvester with little change therein, and which will, under all circumstances, deliver the grain in proper shape to the binding devices. With these ends in view I combine, with a sweep-rake harvesting machine, a binding mechanism, located behind the harvester-frame, and a transverse endless grain-conveyer, arranged in place of the usual platform, to receive the grain as it falls from the cutter and deliver it to the binding mechanism proper.

The first feature of my invention is designed to secure the delivery of the grain to the binding mechanism by the conveyer in a straight, untangled condition; and consists in so constructing and arranging the conveyer and the rake-arms with reference to each other that the arms carry the falling grain backward on the conveyer until the butts are in rear of the cutter and out of the way of the standing grain, after which the arms rise and leave the grain lying squarely across the conveyer. By carrying the butts of the grain backward, as stated, out of the way of the standing grain, the latter is prevented from holding back the butts while the heads are being advanced on the conveyer, the result of which would be to turn the grain diagonally upon the conveyer and cause its delivery to the binding devices in a crooked and tangled condition, in which condition it would produce loose and irregular bundles and bundles of uneven length. The form or construction of the rake employed may be modified in its details, provided it carries the butts of the grain backward, clear of the standing grain, my invention consisting, broadly, in the combination of the conveyer with any rake adapted so to do.

The second feature of my invention relates to the means employed for delivering the grain from the conveyer to the binding mechanism and preventing its return; and consists in the combination of two smooth rolls, one above the other, revolving toward each other, the rolls thus arranged serving to carry the grain forward, but, by reason of their smoothness and the direction of their movement, preventing it from moving backward toward the receiver.

The invention also further consists in various details hereinafter described.

Figure 2:
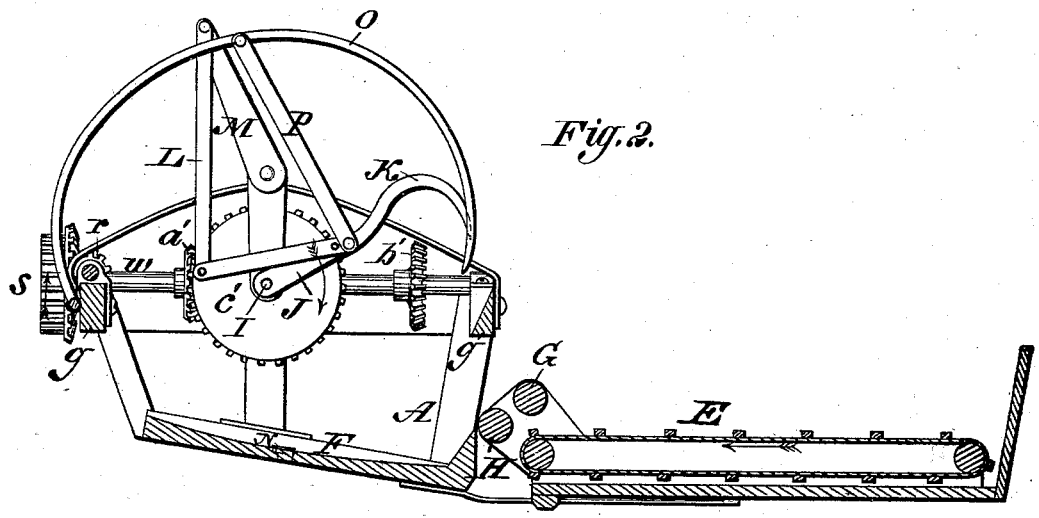
Figure 3:
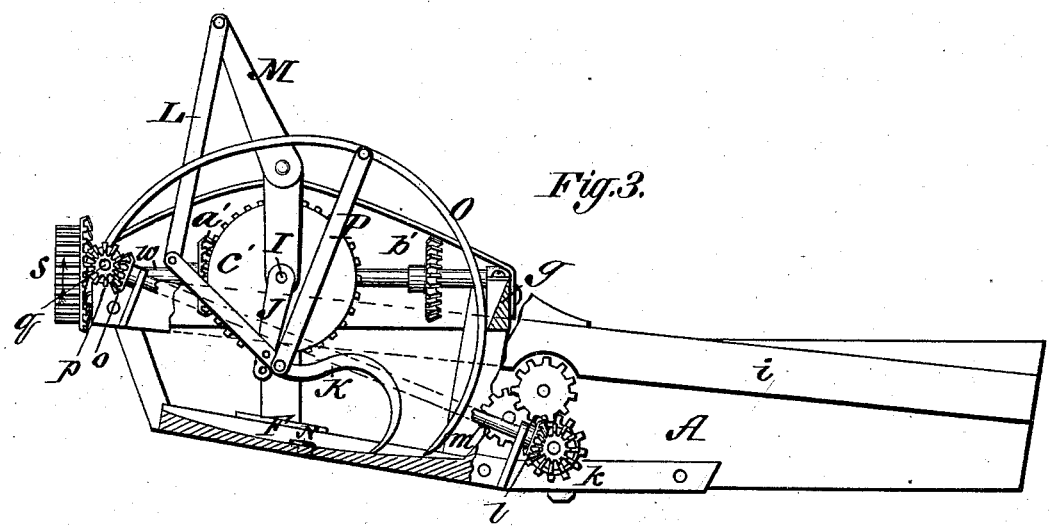

Figure 1 represents a perspective view of my harvester and binder complete; Fig. 2, a cross-section of the same on the line $x\ x$; Fig. 3, a view illustrating the construction and operation of the divider and binder-arm.

A represents the harvester-frame; B, the driving-wheel; C, the cutter, and D the revolving and vertically-moving rake-arms, all of which parts may be of substantially the same construction as any of the approved rear-cut sweep-rake machines now in use. E represents a horizontal endless conveyer or apron mounted transversely of the machine behind the cutter-bar, in position to receive the cut grain as it falls backward.

The rake is so constructed and arranged that the teeth of its arms reel the grain to the cutter, and also sweep backward with the cut grain to a point in rear of the cutters, and, if desired, over the front edge of the conveyer, so as to carry the grain back on the conveyer until the butts are out of the way of the standing grain. As soon as the arms have thus carried the grain to the required point, their teeth are rolled or raised upward from the grain, so as to pass above and entirely clear of the same, in order that it may lie undisturbed upon the apron, which carries it steadily forward.

F represents a binding table or platform arranged behind the harvester-frame at the end of the conveyer in position to receive grain therefrom. At the inner end of the conveyer, parallel therewith, and between it and the binding-table, there are located two smooth horizontal rollers, G H, arranged to revolve in opposite directions, so that their adjacent faces turn to feed the cut grain in the same direction and away from the conveyer. As the grain is presented to these rolls by the conveyer, they carry it between them and deliver it in a regular and uniform manner upon the binding-table. As the rolls extend a considerable distance above the table, and on the side next to the table turn away from each other, they serve to prevent the grain from flowing or being crowded back toward the conveyer by the binding-wire in its advance.

Above the binding-table, in supports above and entirely independent of the same, there is mounted a horizontal shaft, I, bearing a crank, J, having its wrist journaled in the middle of a binding or wire-carrying arm, K, the rear end of which latter is pivoted to the lower end of a sway-bar, L, which is, in turn, pivoted at its upper end to a supporting arm or standard, M, of the main frame. The rotation of the crank causes the nose of the binder-arm to descend with the wire through the loose grain at a point close to the feed-rolls, and then pass backward with the bundle through or immediately above the table, and, finally, after the wire is fastened, to rise and move forward preparatory to another descent.

As a means of fastening the wire or other band around the grain I employ a wire-twister, cord-tier, or other fastening device N, as the case may be, of ordinary construction, in or upon the table, and operate it by any ordinary or suitable mechanism. This device will be preferably of the class which remain fixed in one position, but may be of the class which move forward and backward with the binder-arm. The construction of this device constitutes no part of my invention, and, as they are well known in the art, a detailed description of the same is unnecessary.

It is to be particularly noted that, as shown in the drawings, the sway-bar by which the binder-arm is sustained is overhead, and that there is no direct connection or obstruction in the path of the grain between the binding-table or twister and the binder-arm or its supports, or, in other words, that a clear, unobstructed space through which the grain may pass extends from the conveyer beneath the binder-arm to the outside or stubble side of the binding-table. This construction admits of the binder-arm taking the grain from the rolls, binding it on the table, and delivering it directly over the side of the machine, the grain traveling directly and in a straight line through and from the binding devices, so that each bundle pushes off the preceding one sidewise directly from the table.

As a means of effecting a more thorough separation between each bundle and the loose grain, a divider-arm, O, is attached by a horizontal pivot to the outer side of the frame, and connected by a pitman, P, to the crank which carries the binder-arm, as shown. The divider-arm and its connections are so constructed and arranged that its pointed end descends with the nose of the binder-arm through the grain, and then remains at rest, or practically so, and holds back the grain while the binder-arm moves forward with the bundle. After the bundle is bound, and the ascent of the binder-arm commences, the divider also rises to permit the advance of the loose grain upon the table, and while thus elevated the binder-arm advances to meet it, preparatory to their next descent through the grain.

Having described the general construction of the machine, I will now describe the minor details.

The main frame consists of two longitudinal side bars, $g\,g$, connected by a front cross-bar, $h$, and a rear cross-bar, $i$, which latter is continued across the rear end of the frame or platform which carries the conveyer.

The binding-table and conveyer-frame are connected at their adjacent ends, and receive support at the front by arms $j$, extending downward from the main frame to the binding-table, as shown.

The rake is of the same general construction as those for which Letters Patent have hitherto been granted to me at various times.

The toothed arms, which have a rocking or rolling action as they cease acting on the grain, have their inner ends journaled in short heads $a$, which are connected by horizontal pivots to the top of a rotary carrying-wheel, $b$. An inclined track or cam, $c$, upon which the arms ride, serves to tip them up endwise in succession and maintain them in an elevated position, except during their time of action, as usual in this class of rakes.

On the inner end of each rake-arm there is secured a plate, $d$, and above and below the arms, respectively, there are two fixed plates, $e$ and $f$, secured to the main frame. As each arm descends against the grain its plate $d$ passes under the plate $e$, which holds the arm from rolling and keeps its teeth in the required position to act upon the grain; but when the teeth have carried the grain back to the proper point the plate $d$ rides from under the plate $e$ and over plate $f$, which causes the arm to roll its teeth upward toward the cutters away from the grain.

The rollers which feed the grain from the conveyer to the binding-table and the roll which sustains the inner end of the conveyer are geared together at their rear ends, so that they move in unison, and the conveyer-roll is provided with a beveled pinion, $k$, which is driven by a pinion, $l$, mounted on a transverse shaft, $m$. This shaft in turn receives motion through beveled pinions $o\,p$ from a shaft, $q$, mounted on the stubble side of the main frame, and provided at its forward end with a pinion, $r$, meshing with a pinion on the side of a gear-wheel, $s$, which receives motion through an intermediate pinion, $t$, from a gear-wheel, $u$, secured to the side of the main drive-wheel of the harvester, which latter is preferably arranged to turn loosely on its axle.

The gear-wheel $s$ is mounted upon and drives a transverse shaft, $w$, provided with two beveled pinions, $a'$ and $b'$, the former gearing into and driving a wheel, $c'$, on the binder-shaft, and the latter gearing into and driving the rake-head or wheel.

If desired, the rake may be made adjustable at will forward and backward, in order that it may carry the butts of the grain back a greater or less distance, as variations in the length may require; or the same result may be secured by constructing the rake-arms so that they may be caused to move back a greater or less distance in rear of the cutters before rising. In either case a hand-lever or equivalent device, under the control of the driver, will be employed to effect the adjustment.

The combination of the rake and conveyer, in the manner described and shown, will be found valuable for the purpose of automatically dropping the grain in gavels when a binding mechanism is not employed.

In the construction of the machine it is deemed important that all the arms of the rake shall act to carry the grain back of the cutter, as described, as the best results are attained only by such arrangement. The use of a rake in which one or two arms only serve to rake the grain back will not secure the regular and uniform delivery of the grain.

Having thus described my invention, what I claim is—

1. In a harvesting-machine, the combination of the cutter, a transverse endless conveyer in rear of the same, and a rake arranged to carry the butts of the grain backward beyond the cutters, as and for the purpose described.

2. The combination of the cutter-bar, the endless conveyer in rear of the same, and the sweep-rake having its arms arranged to reel the grain to the cutter, rake it backward upon the conveyer until the butts are in rear of the cutter, and then rise out of action.

3. In combination with the conveyer and the table at its end, the intermediate power-driven feed-rolls, arranged to turn toward each other and away from the conveyer, as described and shown.

4. The combination of the crank J, binder-arm K, sway-bar L, divider, and pitman, as shown.

5. The combination of the vibrating divider and a reciprocating binder-arm with the single rotating crank connected directly to the binder-arm and the link P extending from the crank to the divider.

WILLIAM A. KIRBY.

Witnesses:
P. T. DODGE,
W. M. KIRBY.